(12) United States Patent
Charbonneau (10) Patent No.: US 8,649,471 B1
(45) Date of Patent: Feb. 11, 2014

(54) APPLICATION OF CREST FACTOR REDUCTION TO A SIGNAL

(75) Inventor: Terrance W. Charbonneau, Fort Wayne, IN (US)

(73) Assignee: Exelis Inc., McLean, VA (US)

( * ) Notice: Subject to any disclaimer, the term of this patent is extended or adjusted under 35 U.S.C. 154(b) by 187 days.

(21) Appl. No.: 13/314,695

(22) Filed: Dec. 8, 2011

(51) Int. Cl.
*H04L 1/00* (2006.01)

(52) U.S. Cl.
USPC ............ 375/346; 375/295; 375/355; 341/132

(58) Field of Classification Search
USPC ......... 375/295, 296, 316, 317, 319, 346, 350, 375/355; 341/122, 126, 132
See application file for complete search history.

(56) References Cited

U.S. PATENT DOCUMENTS

| | | | | |
|---|---|---|---|---|
| 7,409,009 | B2 * | 8/2008 | Akhtman | 375/296 |
| 8,369,431 | B2 * | 2/2013 | Walker et al. | 375/260 |
| 2004/0037363 | A1 * | 2/2004 | Norsworthy et al. | 375/259 |
| 2005/0008094 | A1 * | 1/2005 | Kramer et al. | 375/296 |
| 2006/0028976 | A1 | 2/2006 | Park et al. | |
| 2009/0060075 | A1 | 3/2009 | Mohebbi | |
| 2009/0153242 | A1 * | 6/2009 | Cygan et al. | 330/10 |
| 2009/0310658 | A1 * | 12/2009 | Garg et al. | 375/222 |

OTHER PUBLICATIONS

Non-Published, co-pending U.S. Appl. No. 13/314,651, filed Dec. 8, 2011.
Non-Published, co-pending U.S. Appl. No. 13/562,724, filed Jul. 31, 2012.
Non-Published, co-pending U.S. Appl. No. 13/362,794, filed Jan. 31, 2012.

* cited by examiner

*Primary Examiner* — Dac Ha
(74) *Attorney, Agent, or Firm* — Edell, Shapiro & Finnan, LLC (57) ABSTRACT

A technique for applying crest factor reduction to a signal involves identifying peaks of an oversampled digital signal that exceed a threshold and generating a correction waveform corresponding to a sequence of correction pulses for respective peaks. The correction waveform is applied to the oversampled digital signal via a delta-sigma modulator to generate an oversampled digital output signal with reduced peaks. The delta-sigma modulator causes most of the energy of the correction waveform in the oversampled digital output signal to fall outside a frequency band of the oversampled digital signal. The oversampled digital output signal is low pass filtered to remove energy outside the frequency band of the oversampled digital signal such that noise introduced into the oversampled digital output signal by the correction waveform is reduced. The oversampled digital output signal is down sampled to produce a digital output signal with a lower sampling rate.

20 Claims, 7 Drawing Sheets

FIG.8

APPLICATION OF CREST FACTOR REDUCTION TO A SIGNAL

BACKGROUND

In a wide variety of contexts, signal transmission systems are required to generate, amplify, and transmit non-constant envelope signals having a significant peak-to-average power ratio. For efficient amplification, it is often desirable to reduce a transmitted waveform's peak-to-average power ratio by signal processing prior to application to a power amplifier. Orthogonal Frequency Division Multiplexing (OFDM) signals are one example of signals that have a non-constant envelope, and crest factor reduction (CFR) techniques are often applied to such signals to reduce signal peaks prior to amplification. Unfortunately, conventional CFR techniques can introduce a significant amount of in-band noise to the signal being transmitted. It would be advantageous to apply crest factor reduction to a non-constant envelope signal without adding substantial in-band noise to the signal.

SUMMARY

Described herein is a technique for applying crest factor reduction to a signal without introducing significant in-band noise. An oversampled digital input signal is analyzed to identify peaks that exceed a crest factor reduction threshold. From the detected peaks, a correction waveform is generated that corresponds to a sequence of correction pulses to be applied to the peaks of the oversampled digital input signal, where the amplitudes of individual correction pulses in the sequence are scaled in accordance with amplitudes of corresponding peaks of the oversampled digital input signal. The correction waveform is applied to the oversampled digital input signal via a delta-sigma modulator to generate an oversampled digital output signal with peaks below the crest factor reduction threshold. The delta-signal modulator causes a majority of the energy of the correction waveform in the oversampled digital output signal to fall outside a frequency band of the oversampled digital input signal such that in-band noise introduced into the oversampled digital output signal by the correction waveform is greatly reduced relative to conventional approaches. The oversampled digital output signal is low pass filtered to remove energy outside the frequency band of the oversampled digital signal. Down sampling is performed on the oversampled digital output signal to produce a digital output signal with a lower sampling rate (e.g., near or closer to the Nyquist sampling rate required to represent the digital signal in accordance with its bandwidth).

The oversampled digital input signal is oversampled, for example, by a factor of at least two relative to a Nyquist sampling rate associated with a bandwidth of the signal. The oversampled digital input signal can be directly synthesized at the oversampling rate, or a non-oversampled digital input signal can be up sampled and then interpolation filtered to produce the oversampled digital input signal. By way of example, the signal operated on by the delta-sigma modulator to perform crest factor reduction can represent an Orthogonal Frequency Division Multiplexing (OFDM) signal. The delta-sigma modulator can be a first or second order delta-sigma modulator or a higher-order delta-sigma modulator, and the input correction waveform can have an integral relationship to the sequence of correction pulses effectively applied by the delta-sigma modulator.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DETAILED DESCRIPTION

The technique described herein minimizes the in-band noise that is generated when crest factor reduction (CFR) is applied to an arbitrary input signal. An arbitrary input signal is oversampled and applied to the input of a digital circuit similar to a delta-sigma analog-to-digital converter (ADC) comprising digital, cascaded integrators. An algorithm selects input peaks that are targeted for cancellation and constructs a suitable correction waveform. The correction waveform is integrated digitally and subtracted from the delta-sigma output to create an error signal that is fed back to the delta-sigma input. By choosing the proper point in the circuit to apply the integrated correction waveform, much of the CFR in-band noise is "shaped" to appear outside the desired signal bandwidth. A low-complexity filter removes this "out-of-band" noise before the oversampled, CFR-corrected output signal is down sampled for transmission.

The described technique achieves crest factor reduction by applying a unique twist to the digital model of a delta-sigma converter. A delta-sigma converter model has two inputs: one is the desired input, and the other is an error input that models the noise shaping effect of the converter architecture. In effect, the delta-sigma error input is transformed into a CFR cancellation or "correction" input that simultaneously cancels the peaks of the desired signal and shapes the cancellation noise to improve signal quality. The CFR technique has applicability to any non-constant envelope transmission or communication system where it is desirable to reduce a transmitted waveform's peak-to-average power ratio by signal processing prior to application to a power amplifier.

Figure 1:
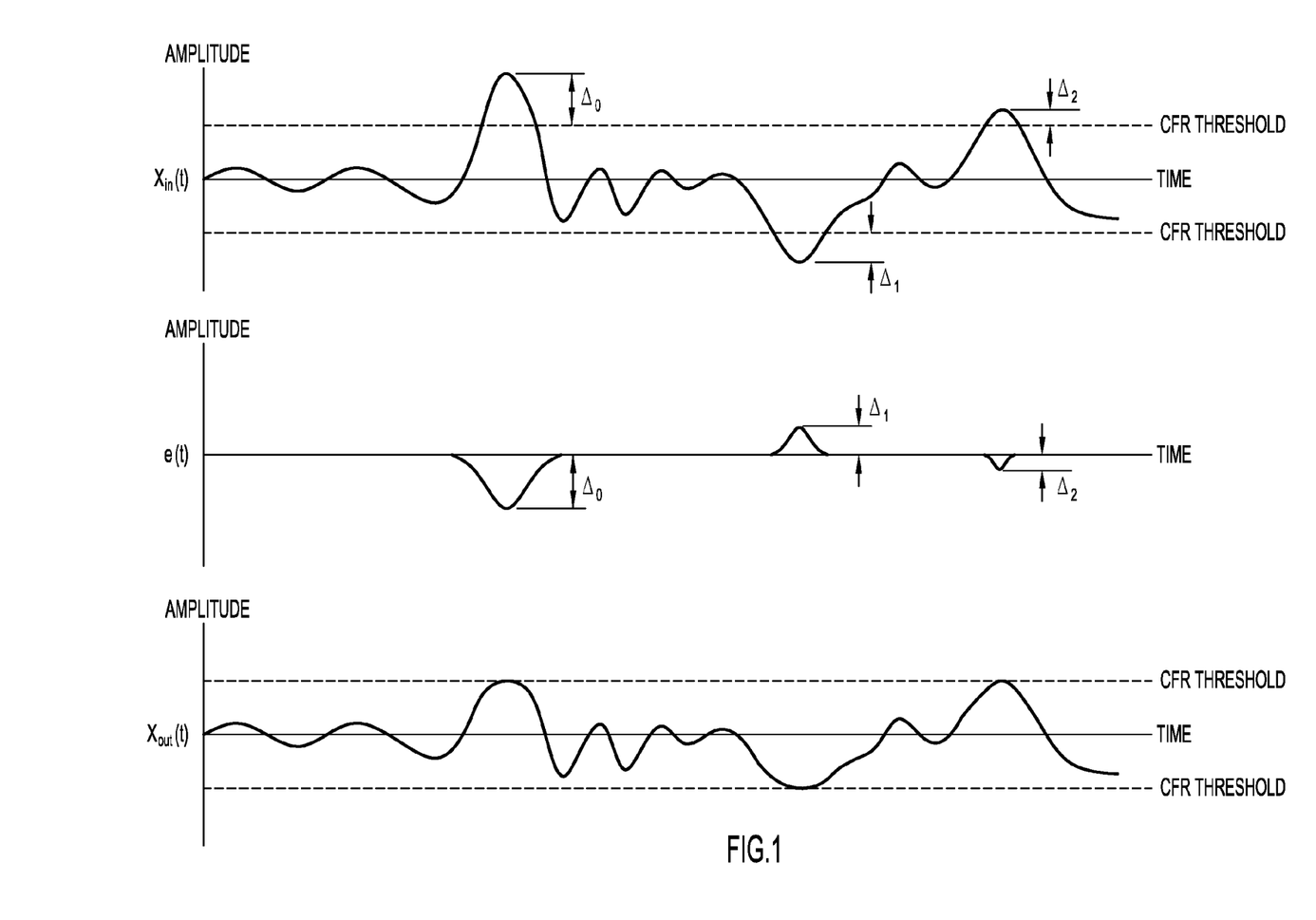
FIG. 1 is a series of time domain graphs illustrating a crest factor reduction technique that adds unwanted in-band noise to a signal.

The concept of the crest factor reduction technique and example implementations are described in greater detail in connection with the figures. For ease of illustrating certain concepts, many of the signals in the figures are depicted as continuous or analog waveforms. However, it will be understood that the crest factor reduction techniques described herein are implemented digitally (i.e., crest factor reduction is applied to a digital signal). A straightforward application of crest factor reduction that adds unwanted in-band noise to a signal is shown in FIG. 1. On the uppermost graph, an arbitrary digital input signal $X_{in}(t)$ is depicted in the time domain as a non-constant envelope signal with a number of positive and negative peaks that are due to the particular nature of the signal (e.g., the type of modulation, the particular information that has been encoded, etc.). Due to prevailing modulation schemes, the digital signals currently employed in most communication systems are non-constant envelope signals, one example of which is OFDM signals. More efficient amplification of such signals can be achieved by reducing the signal peaks of greatest magnitude prior to amplification to yield a signal with a more modest peak-to-average power. In the example shown in FIG. 1, a positive peak of the arbitrary input signal $X_{in}(t)$ exceeds an upper CFR threshold at a first point in time by an amount $\Delta_0$. At a second point in time, a negative peak of signal $X_{in}(t)$ exceeds in magnitude a lower CFR threshold by an amount $\Delta_1$, and the positive CFR threshold is again exceeded by a positive peak of signal $X_{in}(t)$ at a third point in time, in this case by an amount $\Delta_2$.

Crest factor reduction techniques typically involve identifying the greatest magnitude peaks of the signal and introducing a correction or cancellation signal that decreases the peaks below a certain threshold, resulting in better amplification performance (e.g., less power is wasted on DC bias, etc.). One form of crest factor reduction uses scaled correction pulses to reduce local signal peaks. As shown in the middle graph of FIG. 1, a correction signal e(t) can be constructed as a sequence of shaped time-domain pulses that correspond in timing and amplitude to the detected peaks of the input signal $X_{in}(t)$. In this example, the correction signal e(t) includes a first pulse corresponding to the timing of the first peak of signal $X_{in}(t)$. The first pulse is a negative pulse to offset the positive first peak and has an amplitude scaled to correspond to the amount ($\Delta_0$) by which the first peak's magnitude exceeded the CFR threshold. The second pulse is timed to correspond to the second peak and is a positive pulse to offset the negative second peak, with an amplitude corresponding to the amount ($\Delta_1$) by which the second peak's magnitude exceeded the CFR threshold. Likewise, the third pulse is timed to correspond to the third peak and is a negative pulse to offset the positive third peak, with an amplitude corresponding to the amount ($\Delta_2$) by which the third peak's magnitude exceeded the CFR threshold.

By applying the correction signal e(t) to the input signal $X_{in}(t)$, an output signal $X_{out}(t)$ is generated with the greatest magnitude peaks diminished. As shown in the bottom graph of FIG. 1, the pulses of the correction signal e(t) essentially offset the portion of the input signal peaks exceeding the CFR threshold, resulting in output signal peaks that remain within the CFR threshold. By way of example, the correction signal could be applied by delaying the input signal (e.g., a tapped delay line, etc.) to provide time to examine the input signal for peaks and to develop the correction signal, and then applying the correction signal to the delayed input signal (e.g., by summing/multiplying the correction signal into the input signal). In practice, each peak identified in the time domain could actually include several consecutive digital samples of the input signal about a highest peak sample, and each "pulse" of the correction signal can comprise a series of samples that are applied temporally to the input signal.

Figure 2:
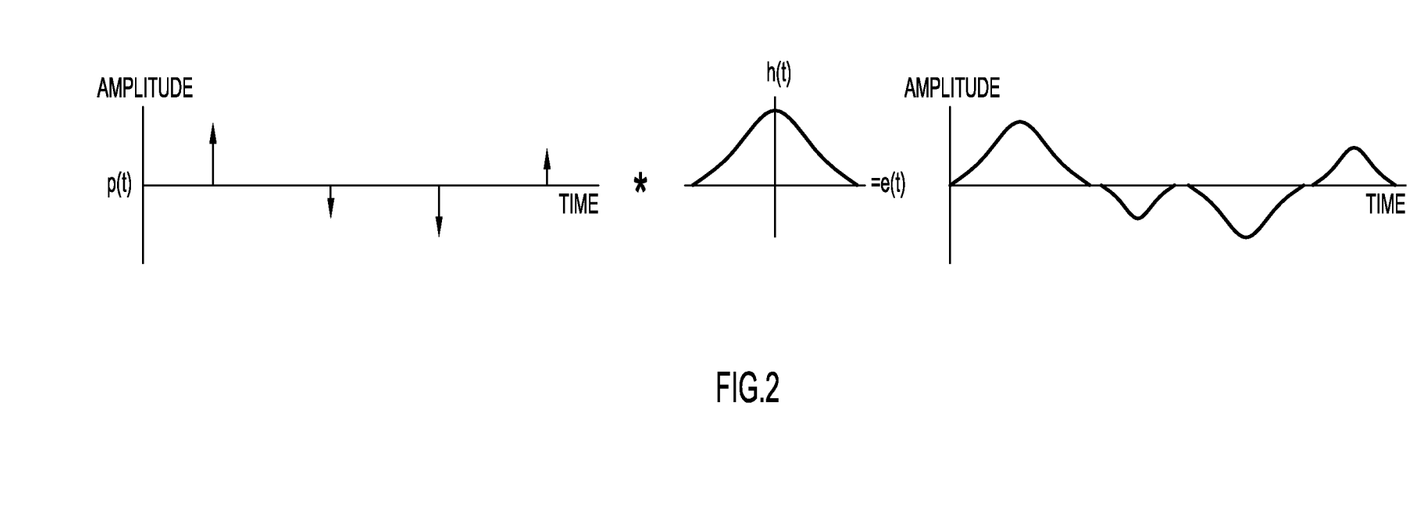
FIG. 2 graphically depicts formation of a correction waveform for applying crest factor reduction to a signal.

As shown in FIG. 2, correction waveform e(t) can be viewed as a random stream of impulses, somewhat like a Poisson process, but with non-unity amplitudes for the $\Delta_i$ values, filtered with reference correction pulse h(t). The impulses in the sequence P(t) correspond in timing and amplitude with peaks to be reduced in the input signal. To generate the correction waveform e(t), the impulse sequence P(t) is convolved with a stored reference correction pulse h(t), which can be, for example, like a Blackman or Hamming filtering window (i.e., in the time domain, e(t)=P(t)*h(t)). The resulting correction waveform comprises a sequence of shifted and scaled versions of the stored reference pulse h(t). That is, the timing of each of the reference pulse replicas in the correction waveform corresponds to one of the peaks of the input signal, and the amplitude of each of the replicas corresponds to the magnitude of the input signal as it appears above the CFR threshold at one of the peaks.

Figure 3:
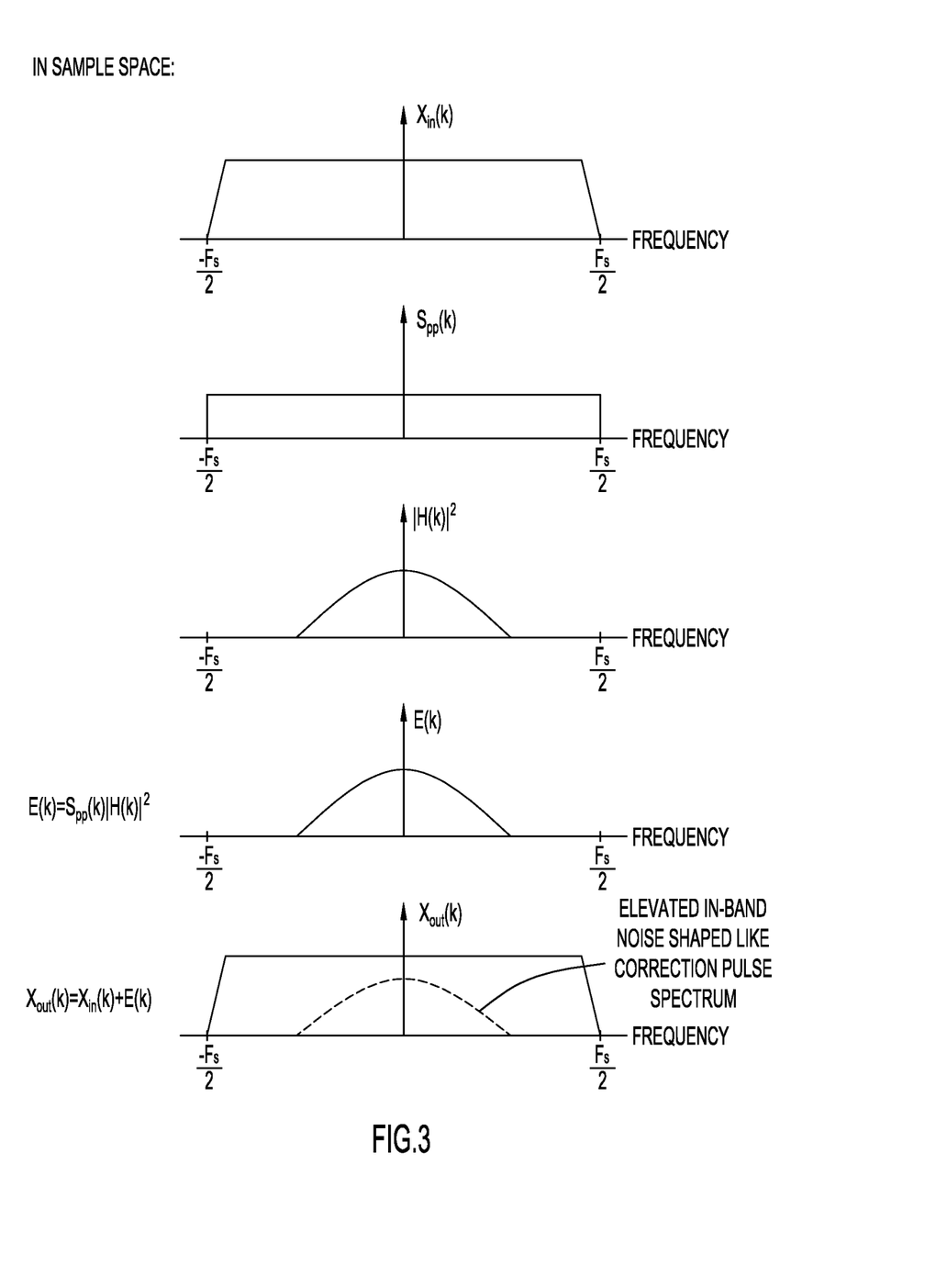
FIG. 3 is a series of frequency domain graphs illustrating the elevated in-band noise resulting from application of the correction waveform to a signal.

FIG. 3 illustrates how the correction waveform can introduce considerable in-band noise when applied to the input signal to reduce peaks. In the topmost graph of FIG. 3, the power spectrum of the input signal $X_{in}(k)$ is represented in sample space (frequency domain) and extends between $-F_S/2$ and $F_S/2$, where $F_S$ is the sampling frequency of a non-oversampled input signal (e.g., sampled at approximately the Nyquist sampling rate). The power spectral density (PSD) of the correction waveform E(k) is the product of the PSD of the impulse sequence P(t), denoted by $S_{pp}(\omega)$, multiplied by the PSD of the reference correction pulse h(t), denoted by $|H(\omega)|^2$ (recall that convolution in time domain is equivalent to multiplication in the frequency domain).

Since the correction impulse sequence P(t) is in effect like a sequence of frequent, randomly spaced impulses of varying amplitudes, it resembles a very wideband, noisy signal. Accordingly, in sample space, the PSD $S_{pp}(\omega)$ has an essentially flat, uniform noise spectrum (like the spectrum of a Poisson process) that extends across the whole sampling frequency bandwidth from the negative half sampling frequency to the positive half sampling frequency. The broadband noise spectrum $S_{pp}(\omega)$ requires extensive bandwidth (high sampling rate). If the sampling rate is not commensurate with non-linear spectral regrowth, aliasing results. The resulting effect is essentially just broadband noise. This flat noise spectrum is then shaped by the spectral magnitude of the reference correction pulse $|H(\omega)|^2$ to yield the PSD of the error correction waveform E(k). When applied to the input signal, the correction waveform spectrum adds into the spectrum of the input signal to produce an output signal corrupted by highly elevated noise around the center of the signal band, as shown in the bottommost graph in FIG. 3.

Figure 4:
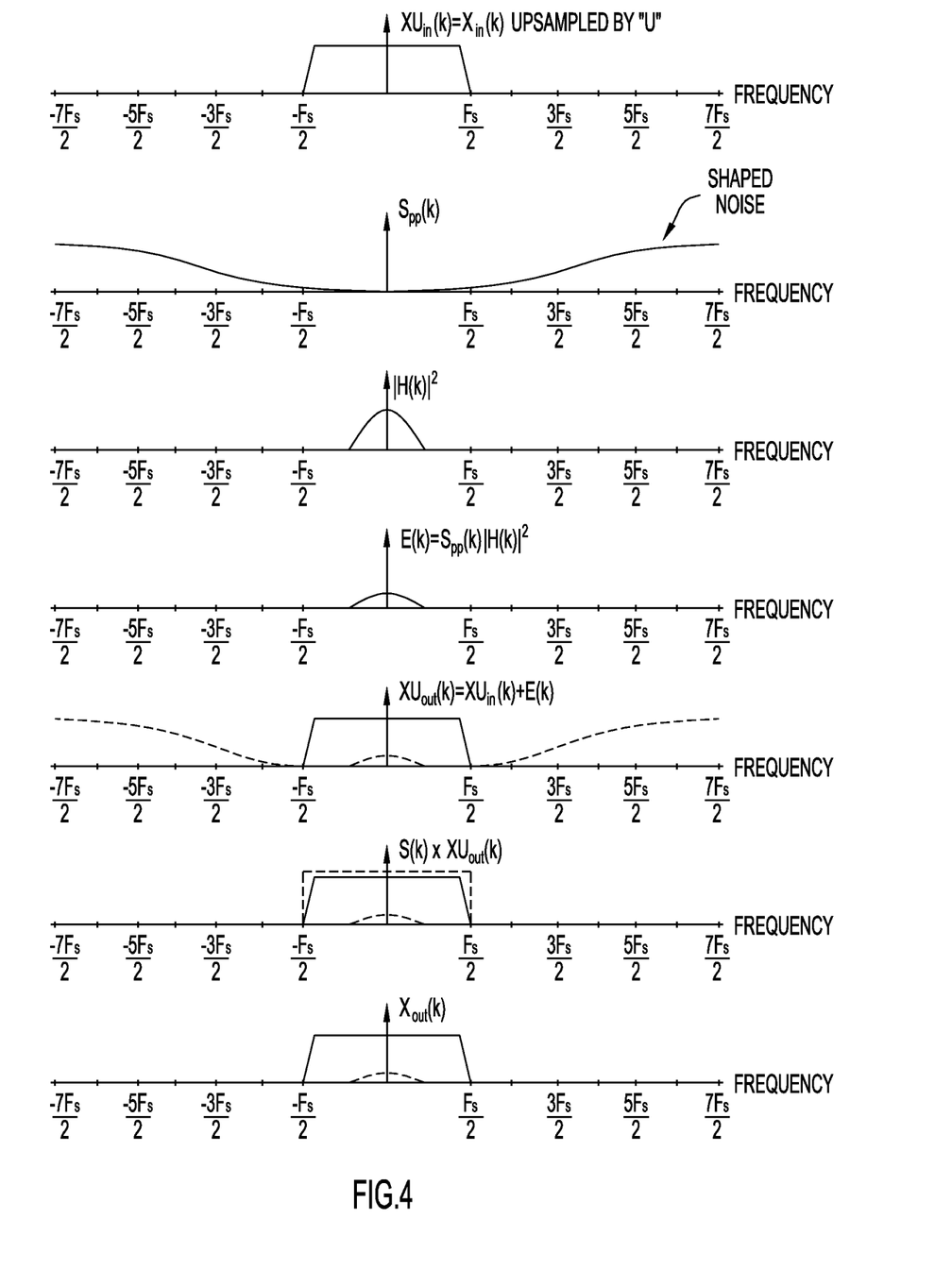
FIG. 4 is a series of frequency domain graphs illustrating reduction of in-band noise from a correction waveform applied to a signal to achieve crest factor reduction in accordance with the techniques described herein.

FIG. 4 illustrates in the sample space the impact of a crest factor reduction technique that avoids most of the in-band noise typically introduced by the correction waveform into the transmit signal. In effect, the underlying "Poisson" PSD of the impulse sequence used to generate the correction waveform is shaped so that, instead of being uniformly flat across the native signal bandwidth $F_S$, it is forced out to the band edges of an oversampled replica. This effect can be accomplished by applying the correction waveform to the input signal using a delta-sigma modulator.

The topmost graph of FIG. 4 shows the spectrum of a highly oversampled signal $XU_{in}(k)$ which is up sampled by a factor U relative to the native, non-oversampled sampling rate $F_S$ of the signal. Note that, like the non-oversampled signal shown in FIG. 3, the energy of the up-sampled signal of interest is primarily in the center of the band (i.e., between $-F_S/2$ and $F_S/2$). The oversampled signal $XU_{in}(k)$ is oversampled by at least a factor of two (U≥2) relative to $F_S$ (e.g., at least twice the critical Nyquist sampling rate required to digitally represent the input signal).

As shown in the second graph of FIG. 4, the shaped noise spectrum $S_{pp}(k)$ is low in the center of the spectrum and higher at the edges. In effect, the delta-sigma processing shapes the Poisson pulses with a high pass signal. The error signal spectrum $E(k)$ is then the multiplication of the high-pass shaped Poisson pulse spectrum $S_{pp}(k)$ and the reference correction pulse spectrum $|H(\omega)|^2$. The result is an error signal spectrum $E(k)$ that has very low energy in the band of interest, with the majority of the energy of the correction waveform falling outside the frequency band of the oversampled digital signal. In the resulting oversampled output signal $XU_{out}(k)$ generated by the delta-sigma modulator applying the correction waveform to the oversampled input signal $XU_{in}(k)$, the correction waveform spectrum (shown in dashed lines in the third graph from the bottom in FIG. 4) is much lower in the signal band of interest compared to the example in FIG. 3.

The delta-sigma processing achieves low noise within the band of interest; however, there still exists a considerable amount of noise outside the signal band of interest. Accordingly, as shown in the second graph from the bottom in FIG. 4, the oversampled output signal $XU_{out}(k)$ is multiplied by a low pass filter $S(k)$ to eliminate the out-of-band noise.

Figure 5:
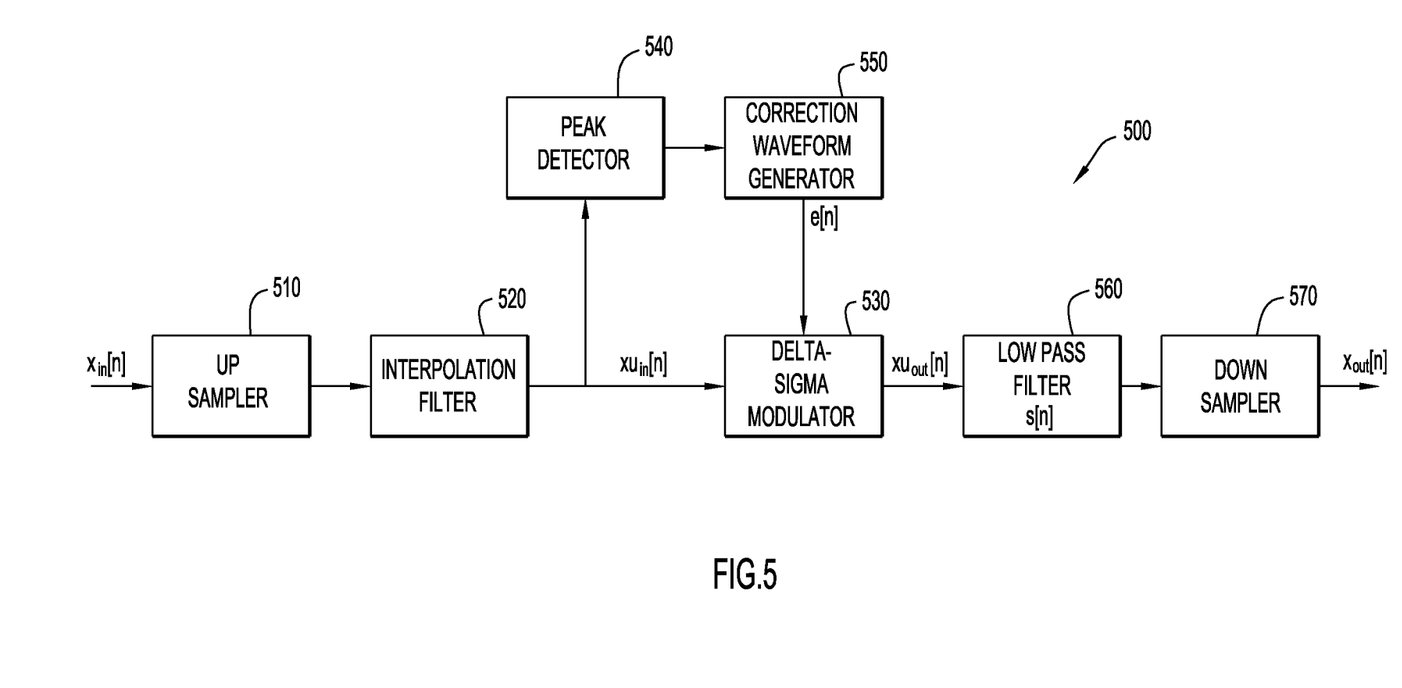
FIG. 5 is functional block diagram illustrating a crest factor reduction system employing a delta-sigma modulator to apply a correction waveform.
Figure 6:
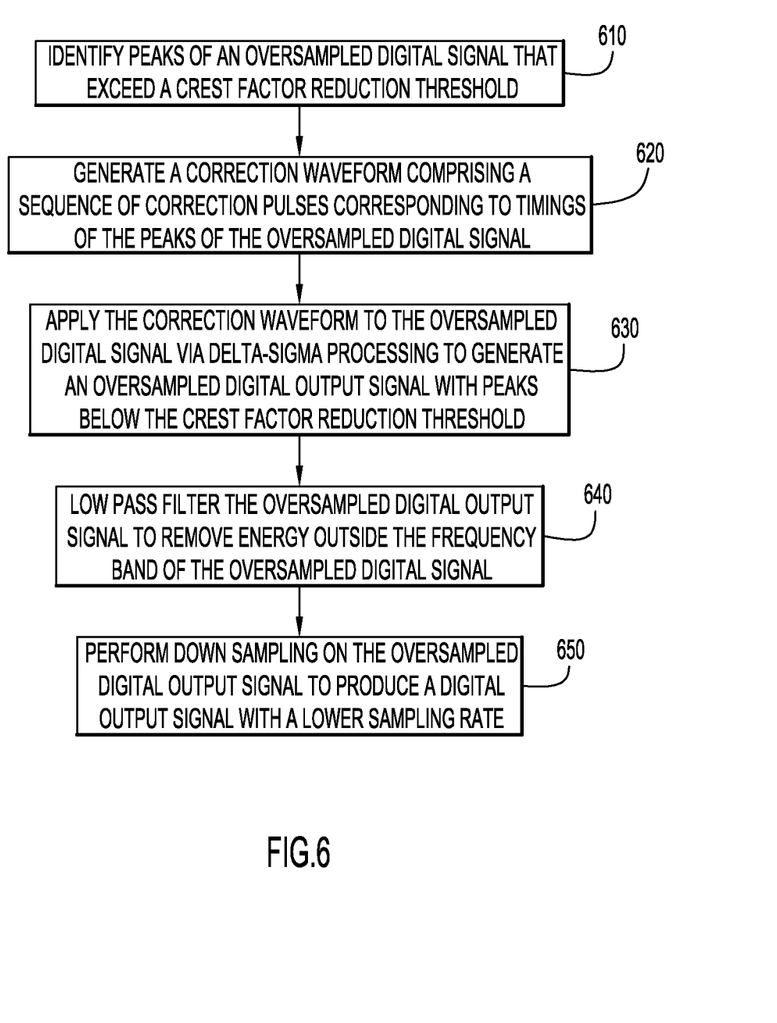
FIG. 6 is a functional flow diagram illustrating operations of a crest factor reduction method.

A top level functional block diagram of an example crest factor reduction system operable according to the principles described herein is shown in FIG. 5. Correspondingly, a functional flow diagram summarizes operations performed to apply crest factor reduction to a signal are shown in FIG. 6. The architecture depicted in FIG. 5 is conceptual to illustrate major functional units, and does not necessarily illustrate physical relationships or imply any specific implementation. The system can be implemented in hardware, firmware, software, or any combination of hardware, firmware, and software. For example, certain functional blocks can be implemented using a processor executing program instructions (software) stored in a storage or memory unit to carry out operations. Thus, at least some of the operations and methodologies described herein can be carried out by executing instructions stored on a non-transitory computer readable medium (i.e., software) on a processor or processors. As used herein, the term "computer readable medium" refers to non-transitory (tangible) media (e.g., a memory or storage device).

The implementation shown in FIG. 5 is carried out digitally. According to one approach, a digital input signal $x_{in}[n]$ represented at a native sampling rate $F_S$ is supplied to an up sampler 510 which increases the sampling rate of the input signal by a factor U of at least two to an oversampling rate. The up-sampled digital input signal is filtered by interpolation filter 520 to produce an oversampled digital input signal $xu_{in}[n]$. According to another approach, the oversampled digital input signal $xu_{in}[n]$ can be directly synthesized by the system (i.e., not produced by up sampling a digital signal at a lower sampling rate).

The oversampled digital input signal $xu_{in}[n]$ is supplied to a delta-sigma modulator 530 and to a peak detector 540. As described in operation 610 shown in FIG. 6, peak detector 540 identifies peaks of the oversampled digital input signal $xu_{in}[n]$ that exceed a crest factor reduction threshold. Essentially, peak detector 540 compares the magnitude of the samples of the oversampled digital input signal $xu_{in}[n]$ to the crest factor reduction threshold to determine which samples exceed the threshold. As shown in FIG. 1 both positive amplitude and negative amplitude peaks are identified in this manner.

Information identifying the peaks of the oversampled digital input signal $xu_{in}[n]$ is supplied from peak detector 540 to a correction waveform generator 550. It will be appreciated that peak detector 540 and correction waveform generator 550 can be implemented separately or can be implemented jointly within a common unit or processor. As shown in operation 620 in FIG. 6, correction waveform generator 550 generates a correction waveform $e[n]$ designed to apply a sequence of correction pulses corresponding to timings of the peaks of the oversampled digital signal via delta-sigma modulator 530. Specifically, the correction waveform $e[n]$ can be constructed to have the effect of applying a sequence of time-shifted and scaled correction pulses, like those shown in FIGS. 1 and 2, which is essentially an impulse sequence $P[n]$, whose impulses correspond in timing and amplitude with the detected peaks, convolved with a stored reference correction pulse $h[n]$ (i.e., a sequence of time-shifted and scaled replicas of the reference correction pulse). However, as described below in greater detail, in order to effectively apply such a correction pulse sequence to the input signal via a delta-sigma modulator, the input correction waveform is actually formed to be a time integral (or double integral, etc.) of the desired correction pulse sequence, depending on the design of the delta-sigma modulator.

Referring again to FIG. 5, oversampled digital input signal $xu_{in}[n]$ is supplied to the signal input of delta-sigma modulator 530, and the correction waveform $e[n]$ is supplied to the error input of delta-sigma modulator 530. As described below in greater detail, delta-sigma modulator 530 applies the correction waveform $e[n]$ to the oversampled digital input signal $xu_{in}[n]$ to generate an oversampled digital output signal $xu_{out}[n]$ with peaks below the crest factor reduction threshold (operation 630 in FIG. 6). Delta-sigma modulator 530 essentially acts as a high pass function with respect to the correction waveform $e[n]$, causing a majority of the energy of the correction waveform in the oversampled digital output signal to fall outside the frequency band of interest for the oversampled digital signal. In effect the "Poisson" PSD or noise of the correction waveform $S_{pp}(\omega)$ is shaped as shown in the second graph of FIG. 4 such that only a fraction of the noise remains in the frequency band of the signal of interest in the output signal (third graph from the bottom in FIG. 4).

In general, delta-sigma modulation is commonly used for encoding high-resolution or analog signals into lower-resolution digital signals. The conversion is performed using error feedback, where the difference between the input and feedback signals is measured and used to improve the conversion. This technique has found increasing use in electronic components such as analog-to-digital converters (ADCs).

Figure 7:
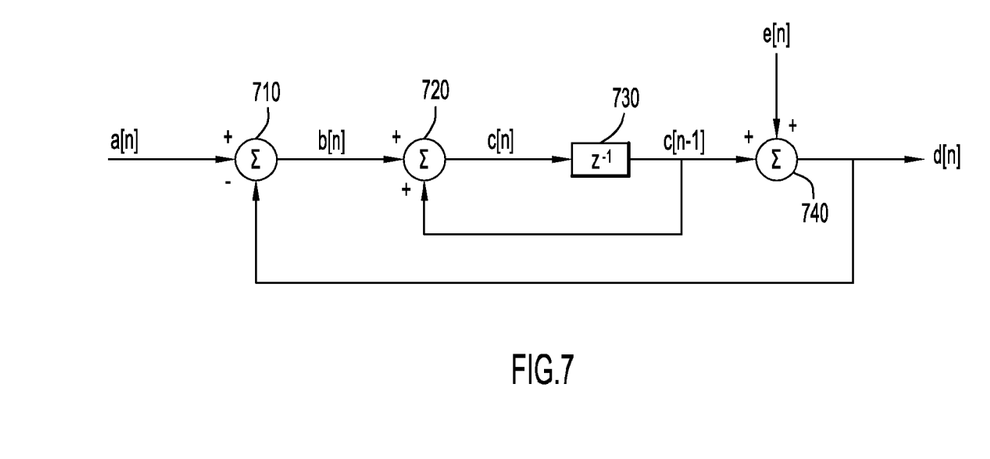
FIG. 7 is a block diagram of an implementation of a first order delta-sigma modulator suitable for use in the system of FIG. 5.

A better understanding of how the delta-sigma modulator provides a high pass function can be gain by considering an example of a first order delta-sigma model shown in FIG. 7 using z-transform notation. A first summer 710 performs a summation operation to produce the signal $b[n]$ as the sum of the oversampled input signal $a[n]$ (i.e., the oversampled digital input signal $xu_{in}[n]$) and the negative feedback of the delta-sigma output signal $d[n]$ ($b[n]=a[n]-d[n]$). A second summer 720 performs a summation operation to produce the signal $c[n]$ as the sum of the signal $b[n]$ and a delayed feedback of the signal $c[n]$, i.e., $c[n-1]$ ($c[n]=b[n]+c[n-1]$). The operations of the second summation, the unit delay, and the feedback of the unit delay implements a digital integration operation. The signal $c[n-1]$ is produced by applying a delay, represented by the $z^{-1}$ operator 730 in FIG. 7, to the signal $c[n]$. A third summer 740 performs a summation operation to produce the output signal $d[n]$ as the sum of $c[n-1]$ and the error signal input $e[n]$ ($d[n]=c[n-1]+e[n]$).

Conventionally, the error signal e[n] is modeled as quantization noise. It does not exist as an actual delta-sigma input, only in theory as a representation of an external noise source with the characteristics of quantization noise. According to the crest factor reduction technique described herein, the signal e[n] is employed as an actual input to the delta-sigma modulator. In particular, the error signal e[n] is used to represent the correction waveform (i.e., the pulse correction sequence used to apply crest factor reduction to the input signal), as previously described.

According to this first order delta-sigma model, using z-domain notation, $$C(z)=B(z)+z^{-1}C(z); \text{ or } B(z)=(1-z^{-1})C(z) \quad (1)$$

$$D(z)=E(z)+z^{-1}C(z); \text{ or } C(z)=[D(z)-E(z)]/z^{-1} \quad (2)$$

$$B(z)=A(z)-D(z) \quad (3)$$

Equating equations (1) and (3):

$$B(z)=(1-z^{-1})C(z)=A(z)-D(z)$$

or $$C(z)=[A(z)-D(z)]/(1-z^{-1}) \quad (4)$$

Equating equations (2) and (4):

$$\frac{A(z)-D(z)}{1-z^{-1}} = \frac{D(z)-E(z)}{z^{-1}} \quad (5)$$

Rearranging terms yields:

$$z^{-1}[A(z)-D(z)]=(1-z^{-1})[D(z)-E(z)]$$

$$z^{-1}A(z)-z^{-1}D(z)=(1-z^{-1})D(z)-(1-z^{-1})E(z)$$

$$z^{-1}A(z)=(1-z^{-1}+z^{-1})D(z)-(1-z^{-1})E(z)$$

$$z^{-1}A(z)=D(z)-(1-z^{-1})E(z)$$

$$D(z)=z^{-1}A(z)+(1-z^{-1})E(z) \quad (6)$$

Evaluating D(z)/A(z) at E(z)=0 yields:

$$\left.\frac{D(z)}{A(z)}\right|_{E=0} = z^{-1} \quad (7)$$

which represents a pure delay of one sample.

Evaluating D(z)/E(z) at A(z)=0 yields:

$$\left.\frac{D(z)}{E(z)}\right|_{A=0} = 1-z^{-1} \quad (8)$$

which represents a high pass function, i.e., the noise-shaping transfer function for the correction waveform E(z) that forces the majority of the energy of the correction waveform out of the frequency band of the digital signal and reduces the in-band noise caused by the correction waveform.

Re-expressing equation (6) in a discrete time representation, $$d[n]=a[n-1]+(e[n]-e[n-1]) \quad (9)$$

In other words, the foregoing mathematical analysis reveals that the first order delta-sigma circuit model shown in FIG. 7 generates as an output the original input signal to the delta-sigma modulator that is delayed by a sample plus the noise-shaped crest factor reduction sequence, and effectively implements a noise-shaping transfer function (high pass filter) that forces most of the correction waveform energy in the output signal out of the signal band of interest.

Referring once again to the general block diagram of FIG. 5, the oversampled digital output signal $xu_{out}(t)$ generated by delta-sigma modulator 530 is supplied to a low pass filter 560 that digitally applies low pass filtering s(n) to the oversampled digital output signal $xu_{out}(t)$ to remove the correction waveform energy outside the frequency band of interest from the oversampled digital output signal, i.e., approximately outside the frequency band $-F_S/2$ to $F_S/2$ (operation 640 in the flowchart of FIG. 6). This low pass filtering (S(k) in the frequency domain) is shown in the second graph from the bottom in FIG. 4. The low pass filtered oversampled digital output signal $xu_{out}(t)$ is then down sampled (operation 650) by a down sampler 570 to produce a digital output signal with a lower sampling rate than the oversampled signal (e.g., a sampling rate approximately equal to the native sampling rate $F_S$ corresponding to the bandwidth of the signal of interest).

While a one stage (first order) delta-sigma modulator is effective in forcing the correction waveform noise out of the signal band of interest, a two stage (second order) delta-sigma modulator provides even better noise shaping, resulting in the noise being pushed even further out in the frequency spectrum and further decreasing the in-band noise from the correction waveform. In general, the higher the order of the delta-sigma model, the better the corresponding noise shaping and reduction become. The system described herein is not limited to any particular delta-sigma modulation design, and a first-order, second-order, or higher order delta-sigma modulator can be employed to apply a crest factor reduction to a signal.

Figure 8:
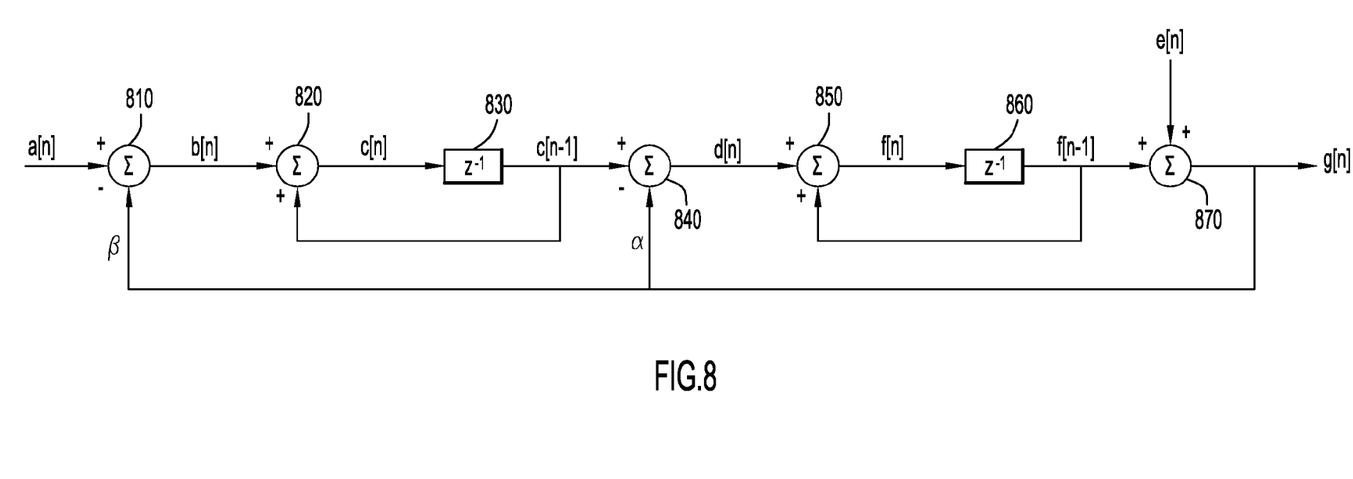
FIG. 8 is a block diagram of an implementation of a second order delta-sigma modulator suitable for use in the system of FIG. 5.

FIG. 8 is a block diagram of a second order delta-sigma model, using z-transform notation, that can be used to implement the delta-sigma modulator 530 of the crest factor reduction system shown in FIG. 5. A first summer 810 performs a first summation operation to produce the signal b[n] as the sum of the oversampled input signal a[n] (i.e., the oversampled digital input signal $xu_{in}[n]$) and the negative feedback of the delta-sigma output signal g[n] multiplied by the gain factor β (b[n]=a[n]−βg[n]). A second summer 820 performs a second summation operation to produce the signal c[n] as the sum of the signal b[n] and a delayed feedback of the signal c[n], i.e., c[n−1] (c[n]=b[n]+c[n−1]). The combination of the second summation operation, the unit delay, and the feedback implements a first integrator in this topology. The signal c[n−1] is produced by applying a delay, represented by the $z^{-1}$ operator 830 in FIG. 8, to the signal c[n]. A third summer 840 performs a third summation operation to produce the signal d[n] as the sum of c[n−1] and the negative feedback of the delta-sigma output signal g[n] multiplied by the gain factor α (d[n]=c[n−1]−ag[n]). A fourth summer 850 performs a fourth summation operations to produce the signal f[n] as the sum of the signal d[n] and a delayed feedback of the signal f[n], i.e., f[n−1] (f[n]=d[n]+f[n−1]). The combination of the fourth summation, the unit delay, and the feedback implements a second integrator in this topology. The signal f[n−1] is produced by applying a delay, represented by the $z^{-1}$ operator 860 in FIG. 8, to the signal f[n]. A fifth summer 870 performs a fifth summation operation to produce the output signal g[n] as the sum of f[n−1] and the error signal input e[n] (g[n]=f[n−1]+e[n]).

According to this second order delta-sigma model, using z-domain notation, $$B(z)=A(z)-\beta G(z) \quad (10)$$

$$C(z)=B(z)+z^{-1}C(z); \text{ or } B(z)=(1-z^{-1})C(z) \quad (11)$$

$$D(z)=z^{-1}C(z)-\alpha G(z) \quad (12)$$

$$F(z)=D(z)+z^{-1}F(z); D(z)=(1-z^{-1})F(z) \quad (13)$$

$$G(z)=E(z)+z^{-1}F(z) \quad (14)$$

Equating equations (10) and (11):

$$B(z)=A(z)-\beta G(z)=(1-z^{-1})C(z)$$

or $$C(z)=[A(z)-\beta G(z)]/(1-z^{-1}) \quad (15)$$

Equating equations (12) and (13):

$$D(z)=z^{-1}C(z)-\alpha G(z)=(1-z^{-1})F(z)$$

or $$C(z)=[(1-z^{-1})F(z)+\alpha G(z)]/z^{-1} \quad (16)$$

Equating equations (15) and (16):

$$\frac{A(z)-\beta G(z)}{1-z^{-1}} = \frac{(1-z^{-1})F(z)+\alpha G(z)}{z^{-1}} \quad (17)$$

Rearranging terms yields:

$$z^{-1}[A(z)-\beta G(z)]=(1-z^{-1})[(1-z^{-1})F(z)+\alpha G(z)]$$

$$z^{-1}A(z)-\beta z^{-1}G(z)=(1-z^{-1})^2F(z)+\alpha(1-z^{-1})G(z)$$

$$(1-z^{-1})^2F(z)=z^{-1}A(z)-\beta z^{-1}G(z)-\alpha(1-z^{-1})G(z)$$

$$(1-z^{-1})^2F(z)=z^{-1}A(z)-[\beta z^{-1}+\alpha(1-z^{-1})]G(z)$$

$$(1-z^{-1})^2F(z)=z^{-1}A(z)-[\beta z^{-1}+\alpha-\alpha z^{-1}]G(z)$$

$$(1-z^{-1})^2F(z)=z^{-1}A(z)-[\alpha+(\beta-\alpha)z^{-1}]G(z)$$

$$F(z)=\frac{z^{-1}A(z)}{(1-z^{-1})^2}-\frac{\alpha+(\beta-\alpha)z^{-1}}{(1-z^{-1})^2}G(z) \quad (18)$$

Substituting equation (18) into equation (14) yields:

$$G(z)=E(z)+z^{-1}\frac{\{z^{-1}A(z)-[\alpha+(\beta-\alpha)z^{-1}]G(z)\}}{(1-z^{-1})^2} \quad (19)$$

Rearranging terms:

$$(1-z^{-1})^2G(z)=(1-z^{-1})^2E(z)+z^{-2}A(z)-z^{-1}[\alpha+(\beta-\alpha)z^{-1}]G(z)$$

$$G(z)\{(1-z^{-1})^2+z^{-1}[\alpha+(\beta-\alpha)z^{-1}]\}=z^{-2}A(z)+(1-z^{-1})^2E(z)$$

$$G(z)\{1-2z^{-1}+z^{-2}+\alpha z^{-1}+(\beta-\alpha)z^{-2}\}=z^{-2}A(z)+(1-z^{-1})^2E(z)$$

$$G(z)\{1+(\alpha-2)z^{-1}+(1+\beta-\alpha)z^{-2}\}=z^{-2}A(z)+(1-z^{-1})^2E(z) \quad (20)$$

Let $\alpha=2$. If $1+\beta-\alpha=0$, then $\beta=\alpha-1=2-1=1$. Substituting these values into equation (20) gives:

$$G(z)=z^{-2}A(z)+(1-z^{-1})^2E(z) \quad (21)$$

Evaluating $G(z)/A(z)$ at $E(z)=0$ yields:

$$\left.\frac{G(z)}{A(z)}\right|_{E=0} = z^{-2} \quad (22)$$

which represents a pure two-sample delay.

Evaluating $G(z)/E(z)$ at $A(z)=0$ yields:

$$\left.\frac{G(z)}{E(z)}\right|_{A=0} = (1-z^{-1})^2 \quad (23)$$

which represents a higher order high pass filter than the first order delta-sigma modulator, which forces more noise further out in the frequency spectrum.

Re-expressing equation (21):

$$G(z)=z^{-2}A(z)+(1-2z^{-1}+z^{-2})E(z) \quad (24)$$

The equation can be expressed in a discrete time representation as:

$$g[n]=a[n-2]+(e[n]-2e[n-1]+e[n-2]) \quad (25)$$

where the first term represents the delayed CFR input (i.e., the oversampled digital input signal $xu_{in}[n]$, and the second term is the CFR cancellation sequence.

Comparing the first order delta-sigma modulator to the second order-delta sigma modulator in mathematical terms, recall from equation (9) that $d[n]=a[n-1]+(e[n]-e[n-1])$. This can be re-expressed as $$d[n]=a[n-1]+q[n] \quad (26)$$

where $q[n]=e[n]-e[n-1]$, which represents a first-order differentiator. Likewise, from equation (25), g[n] can be re-expressed as:

$$g[n]=a[n-2]+r[n] \quad (27)$$

where $r[n]=(e[n]-2e[n-1]+e[n-2])$, which represents a double first-order differentiator.

For the first-order model, q[n] is desired to be the pulse correction sequence; however, q[n] is the result of a first-order differencing operation on the input sequence e[n]. Therefore, e[n] is the first-order integral of q[n]. For the second-order model, r[n] is desired to be the pulse correction sequence; however, r[n] is the result of a double first-order differencing operation on the input sequence e[n]. Therefore, e[n] is the first-order double integral of r[n]. Thus, referring back to FIG. 5, in order to effectively apply a sequence of time-shifted and scaled reference correction pulses to the input signal to effect crest factor reduction via delta-sigma modulator 530, the input correction waveform e[n] is actually constructed as a time integral of the pulse sequence itself. For a first-order delta-sigma modulator, the input correction waveform e[n] is the first order integral of the correction pulse sequence, and for a second-order delta-sigma modulator, the input correction waveform e[n] is a second-order double integral of the correction pulse sequence. Thus, the input correction waveform corresponds to the underlying correction pulse sequence in the sense that it has some integral relationship to it.

In summary, the use of a delta-sigma modulator to perform crest factor reduction to a signal effectively applies a high pass filter to the correction waveform such that the signal of interest is still modified to reduce local peaks but without introduction of significant in-band noise. Instead of distributing the resulting correction noise across the signal band of interest, the noise is shaped with a high pass filter response so that most of the noise is forced out to higher frequencies and very little of the noise ends up at the lower frequency of the signal of interest. The oversampling of the signal being filtered allows the shaped noise to remain at higher frequencies and not alias into the lower frequencies containing the signal of interest (the signal of interest in the oversampled signal spectrum occupies only a small fraction of the sampling bandwidth).

Having described preferred embodiments of new and improved crest factor reduction techniques, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. An apparatus for applying a crest factor reduction to a signal, comprising:
    a peak detector module configured to identify peaks of an oversampled digital signal that exceed a crest factor reduction threshold;
    a correction waveform generator configured to generate a correction waveform corresponding to a sequence of correction pulses for respective peaks of the oversampled digital signal;
    a delta-sigma modulator configured to receive the oversampled digital signal at a signal input and the correction waveform at an error input and to apply the correction waveform to the oversampled digital signal to generate an oversampled digital output signal with peaks below the crest factor reduction threshold, wherein the delta-signal modulator causes a majority of the energy of the correction waveform in the oversampled digital output signal to fall outside a frequency band of the oversampled digital signal;
    a low pass filter configured to filter the oversampled digital output signal to remove energy outside the frequency band of the oversampled digital signal such that noise introduced into the oversampled digital output signal by the correction waveform is reduced; and
    a down-sampling module configured to perform down sampling on the oversampled digital output signal to produce a digital output signal with a lower sampling rate than the oversampled digital output signal.

2. The apparatus of claim 1, wherein the oversampled digital signal is oversampled by a factor of at least two relative to a Nyquist sampling rate of the oversampled digital signal.

3. The apparatus of claim 1, wherein amplitudes of individual correction pulses in the sequence are scaled in accordance with amplitudes of corresponding peaks of the oversampled digital signal.

4. The apparatus of claim 1, further comprising:
    an up-sampling module configured to perform up sampling on a digital input signal to produce an up-sampled digital input signal sampled at the oversampling rate; and
    an interpolation filter configured to generate the oversampled digital signal from the up-sampled digital input signal.

5. The apparatus of claim 1, wherein the oversampled digital signal represents an Orthogonal Frequency Division Multiplexing (OFDM) signal.

6. The apparatus of claim 1, wherein the delta-sigma modulator is a first order delta-sigma modulator and the correction waveform has an integral relationship to the sequence of correction pulses.

7. The apparatus of claim 1, wherein the delta-sigma modulator is a second order delta-sigma modulator and the correction waveform has a double integral relationship to the sequence of correction pulses.

8. A method of applying crest factor reduction to a signal, the method comprising:
    identifying, via a peak detector, peaks of an oversampled digital signal that exceed a crest factor reduction threshold;
    generating a correction waveform corresponding to a sequence of correction pulses for respective peaks of the oversampled digital signal;
    applying the correction waveform to the oversampled digital signal via a delta-sigma modulator to generate an oversampled digital output signal with peaks below the crest factor reduction threshold, wherein the delta-signal modulator causes a majority of the energy of the correction waveform in the oversampled digital output signal to fall outside a frequency band of the oversampled digital signal;
    low pass filtering the oversampled digital output signal to remove energy outside the frequency band of the oversampled digital signal such that noise introduced into the oversampled digital output signal by the correction waveform is reduced; and
    performing down sampling on the oversampled digital output signal to produce a digital output signal with a lower sampling rate than the oversampled digital output signal.

9. The method of claim 8, wherein the oversampled digital signal is oversampled by a factor of at least two relative to a Nyquist sampling rate of the oversampled digital signal.

10. The method of claim 8, wherein generating the correction waveform includes scaling amplitudes of individual correction pulses in the sequence in accordance with amplitudes of corresponding peaks of the oversampled digital signal.

11. The method of claim 8, further comprising:
    performing up sampling on a digital input signal to produce an up-sampled digital input signal sampled at the oversampling rate; and
    interpolation filtering the up-sampled digital input signal to generate the oversampled digital signal.

12. The method of claim 8, wherein the oversampled digital signal represents an Orthogonal Frequency Division Multiplexing (OFDM) signal.

13. The method of claim 8, wherein applying the correction waveform to the oversampled digital signal is performed with a first order delta-sigma modulator and the correction waveform has an integral relationship to the sequence of correction pulses.

14. The method of claim 8, wherein applying the correction waveform to the oversampled digital signal is performed with a second order delta-sigma modulator and the correction waveform has a double integral relationship to the sequence of correction pulses.

15. A non-transitory computer readable medium encoded with software comprising processor-executable instructions that, when executed by a processor, cause the processor to perform functions of:
    identifying peaks of an oversampled digital signal that exceed a crest factor reduction threshold;

generating a correction waveform corresponding to a sequence of correction pulses for respective peaks of the oversampled digital signal;

applying the correction waveform to the oversampled digital signal via delta-sigma modulation to generate an oversampled digital output signal with peaks below the crest factor reduction threshold, wherein the delta-signal modulation causes a majority of the energy of the correction waveform in the oversampled digital output signal to fall outside a frequency band of the oversampled digital signal;

low pass filtering the oversampled digital output signal to remove energy outside the frequency band of the oversampled digital signal such that noise introduced into the oversampled digital output signal by the correction waveform is reduced; and performing down sampling on the oversampled digital output signal to produce a digital output signal with a lower sampling rate than the oversampled digital output signal.

16. The computer readable medium of claim 15, wherein the instructions for identifying peaks include instructions for identifying peaks of the oversampled digital signal that is oversampled by a factor of at least two relative to a Nyquist sampling rate of the oversampled digital signal.

17. The computer readable medium of claim 15, wherein the instructions for generating a correction waveform include instructions for scaling amplitudes of individual correction pulses in the sequence in accordance with amplitudes of corresponding peaks of the oversampled digital signal.

18. The computer readable medium of claim 15, encoded with software comprising further processor-executable instructions that, when executed by a processor, cause the processor to perform the further functions of:

performing up sampling on a digital input signal to produce an up-sampled digital input signal sampled at the oversampling rate; and interpolation filtering the up-sampled digital input signal to generate the oversampled digital signal.

19. The computer readable medium of claim 15, wherein the instructions for identifying peaks include instructions for identifying peaks of the oversampled digital signal which represents an Orthogonal Frequency Division Multiplexing (OFDM) signal.

20. The computer readable medium of claim 15, wherein the instructions for applying the correction waveform to the oversampled digital signal include instructions for performing first order delta-sigma modulation, wherein the correction waveform has an integral relationship to the sequence of correction pulses.

* * * * *